United States Patent
Fan et al.

(10) Patent No.: US 12,504,849 B2
(45) Date of Patent: Dec. 23, 2025

(54) TOUCH DRIVING METHOD WITH SET SUM OF TOUCH DRIVING SIGNALS TO REDUCE FLICKER ON DISPLAY DEVICE

(71) Applicant: ILI TECHNOLOGY CORP., Hsinchu County (TW)

(72) Inventors: Chuan-Chi Fan, Hsinchu County (TW); Yung-Fu Lin, Hsinchu County (TW); Jung-Kuei Hsu, Hsinchu County (TW); Wen-Ger Wong, Hsinchu County (TW); Chia-Chun Hsu, Hsinchu County (TW); Cheng-Chung Hsu, Hsinchu County (TW); Po-Yuan Wang, Hsinchu County (TW); Kai-Wei Shiau, Hsinchu County (TW); Hsin-Mao Huang, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 19/001,416

(22) Filed: Dec. 25, 2024

(65) Prior Publication Data
US 2025/0328206 A1  Oct. 23, 2025

(30) Foreign Application Priority Data
Apr. 17, 2024 (TW) ................................. 113114303

(51) Int. Cl.
*G06F 3/041* (2006.01)
*G06F 3/044* (2006.01)
*G09G 3/32* (2016.01)

(52) U.S. Cl.
CPC ...... *G06F 3/041662* (2019.05); *G06F 3/0412* (2013.01); *G06F 3/04182* (2019.05); *G06F 3/044* (2013.01); *G09G 3/32* (2013.01)

(58) Field of Classification Search
CPC ............ G06F 3/041662; G06F 3/0412; G06F 3/04182; G06F 3/044
See application file for complete search history.

(56) References Cited

U.S. PATENT DOCUMENTS

2015/0277655 A1  10/2015  Kim
2016/0117014 A1   4/2016  Davison et al.
(Continued)

FOREIGN PATENT DOCUMENTS

| CN | 102830882 | 12/2012 |
| CN | 106716839 |  5/2017 |

(Continued)

OTHER PUBLICATIONS

"Office Action of Taiwan Counterpart Application", issued on Aug. 27, 2025, p. 1-p. 8.

*Primary Examiner* — Liliana Cerullo
(74) *Attorney, Agent, or Firm* — JCIPRNET (57) ABSTRACT

Provided is a touch driving method for a touch display device. The touch display device includes a display panel and a touch panel. The touch panel is disposed on the display panel. The touch panel includes a first driving electrode and a second driving electrode. The touch driving method includes: a first touch driving signal is provided to the first driving electrode, and a second touch driving signal is provided to the second driving electrode; a sum of a voltage value of the first touch driving signal and a voltage value of the second touch driving signal is adjusted to continue to be equal to a set voltage value in a mutual-capacitance sensing stage of a mutual-capacitance sensing mode; and the first touch driving signal and the second touch driving signal are adjusted to be a third touch driving signal in a self-capacitance sensing stage of a self-capacitance sensing mode.

13 Claims, 5 Drawing Sheets

(56) References Cited

U.S. PATENT DOCUMENTS

| | | | |
|---|---|---|---|
| 2017/0090637 A1 | 3/2017 | Yoon et al. | |
| 2017/0139540 A1 | 5/2017 | Davison et al. | |
| 2020/0210025 A1 | 7/2020 | Kim et al. | |
| 2022/0043537 A1* | 2/2022 | Lee | G06F 3/04166 |
| 2022/0382451 A1* | 12/2022 | Bihday | G06F 3/0446 |
| 2025/0208731 A1* | 6/2025 | Park | G06F 3/0445 |

FOREIGN PATENT DOCUMENTS

| | | |
|---|---|---|
| CN | 106951133 | 7/2017 |
| CN | 109814762 | 5/2019 |
| TW | 1549046 | 9/2016 |

\* cited by examiner

TOUCH DRIVING METHOD WITH SET SUM OF TOUCH DRIVING SIGNALS TO REDUCE FLICKER ON DISPLAY DEVICE

CROSS-REFERENCE TO RELATED APPLICATION

This application claims the priority benefit of Taiwan application serial no. 113114303, filed on Apr. 17, 2024. The entirety of the above-mentioned patent application is hereby incorporated by reference herein and made a part of this specification.

BACKGROUND

Technical Field

The disclosure relates to a driving method for a display device, and in particular, to a touch driving method for a touch display device.

Description of Related Art

Figure 1:
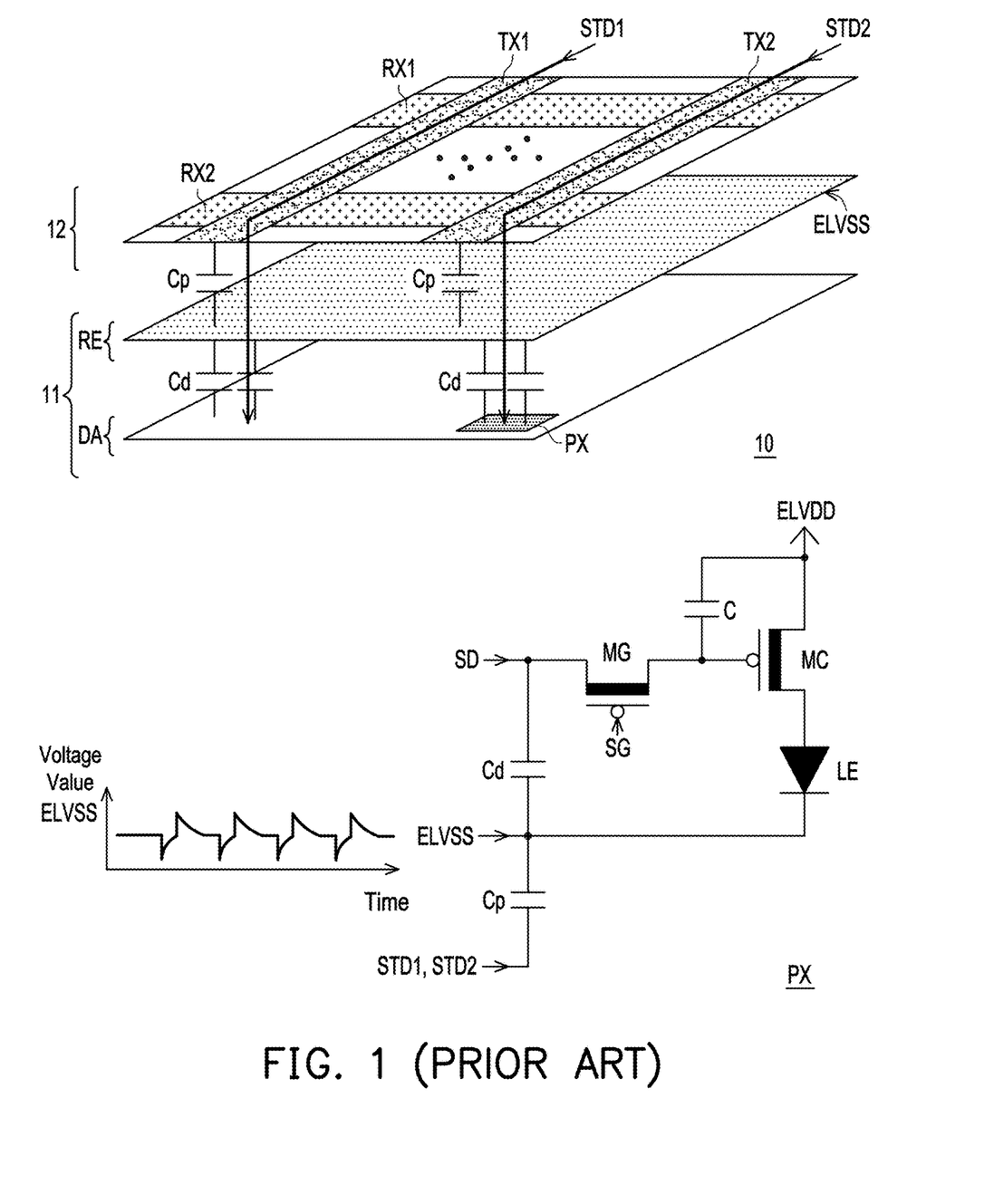
FIG. 1 is a schematic diagram of a current touch display device.

FIG. 1 is a schematic diagram of a current touch display device. A touch display device 10 includes a display panel 11 and a touch panel 12. The touch panel 12 at least includes driving electrodes TX1 and TX2 and sensing electrodes RX1 and RX2. The display panel 11 includes a display area DA and a reference electrode RE. During a touching period, touch driving signals STD1 and STD2 are applied to the driving electrodes TX1 and TX2. The reference electrode RE receives a reference voltage ELVSS. The touch driving signals STD1 and STD2 may interfere with the reference voltage ELVSS received by the reference electrode RE through inductive coupling of a parasitic capacitance Cp between the touch panel 12 and the reference electrode RE in a self-capacitance sensing mode or a mutual-capacitance sensing mode. Therefore, the reference voltage ELVSS may generate a noise based on waveforms of the touch driving signals STD1 and STD2. It should be noted that the noise of the reference voltage ELVSS may affect the display effect of the display panel 11.

For example, the display panel 11 includes a pixel circuit PX. The pixel circuit PX includes transistors MC and MG, a capacitor C and a light emitting element LE. A first end of the transistor MC receives a reference high voltage ELVDD. A second end of the transistor MC is electrically connected to an anode of the light emitting element LE. A cathode of the light emitting element LE is electrically connected to the reference voltage ELVSS. A first end of the transistor MG receives a data signal SD. A second end of the transistor MG is electrically connected to a control end of the transistor MC. A control end of the transistor MG receives a scanning signal SG. The capacitor C is electrically connected between the first end of the transistor MC and the control end of the transistor MC.

The noise generated by the reference voltage ELVSS due to the touch driving signals STD1 and STD2 may interfere with the data signal SD received by the transistor MG through inductive coupling of the parasitic capacitance Cd between the reference electrode RE and the display area DA. Both the data signal SD and the reference voltage ELVSS have the noise. Therefore, when the transistor MG is turned on in response to the scanning signal SG, a driving current received by the light emitting element LE may fluctuate. The light emitting effect of the light emitting element LE may be unstable. Therefore, bright streaks or dark streaks may be generated on the display area DA visually.

It can be seen that how to prevent the touch driving signals STD1 and STD2 from generating the noise interference to the data signal SD is one of the focuses of research for those skilled in the art.

SUMMARY

The disclosure provides a touch driving method for a touch display device, which can effectively prevent a touch driving signal of the touch display device from generating a noise interference to a data signal.

In an embodiment of the disclosure, a touch driving method is for a touch display device. The touch display device includes a display panel and a touch panel. The touch panel is disposed on the display panel. The touch panel includes a first driving electrode and a second driving electrode. The touch driving method includes: a first touch driving signal is provided to the first driving electrode, and a second touch driving signal is provided to the second driving electrode; a sum of a voltage value of the first touch driving signal and a voltage value of the second touch driving signal is adjusted to continue to be equal to a set voltage value in a mutual-capacitance sensing stage of a mutual-capacitance sensing mode; and the first touch driving signal and the second touch driving signal are adjusted to be a third touch driving signal in a self-capacitance sensing stage of a self-capacitance sensing mode.

Based on the above, the sum of the voltage value of the first touch driving signal and the voltage value of the second touch driving signal continues to be equal to the set voltage value in the mutual-capacitance sensing stage. Therefore, the sum of the voltages of the first touch driving signal and the second touch driving signal is a constant value in the mutual-capacitance sensing stage. The voltages of the first touch driving signal and the second touch driving signal do not interfere with the data signal of the display panel. In addition, the first touch driving signal and the second touch driving signal are adjusted in a step-by-step manner to a same third touch driving signal in a mode switching stage. Therefore, the interference of the touch driving signal to the data signal of the display panel can also be reduced during a mutual-capacitance and self-capacitance switching.

DESCRIPTION OF THE EMBODIMENTS

Some embodiments of the disclosure will be described in detail with reference to the accompanying drawings. The reference numerals cited in the following description will be regarded as the same or similar elements when the same reference numerals appear in different drawings. The embodiments are only part of the disclosure and do not disclose all possible implementations of the disclosure.

Rather, the embodiments are merely examples within the scope of the claims of the disclosure.

Figure 2:
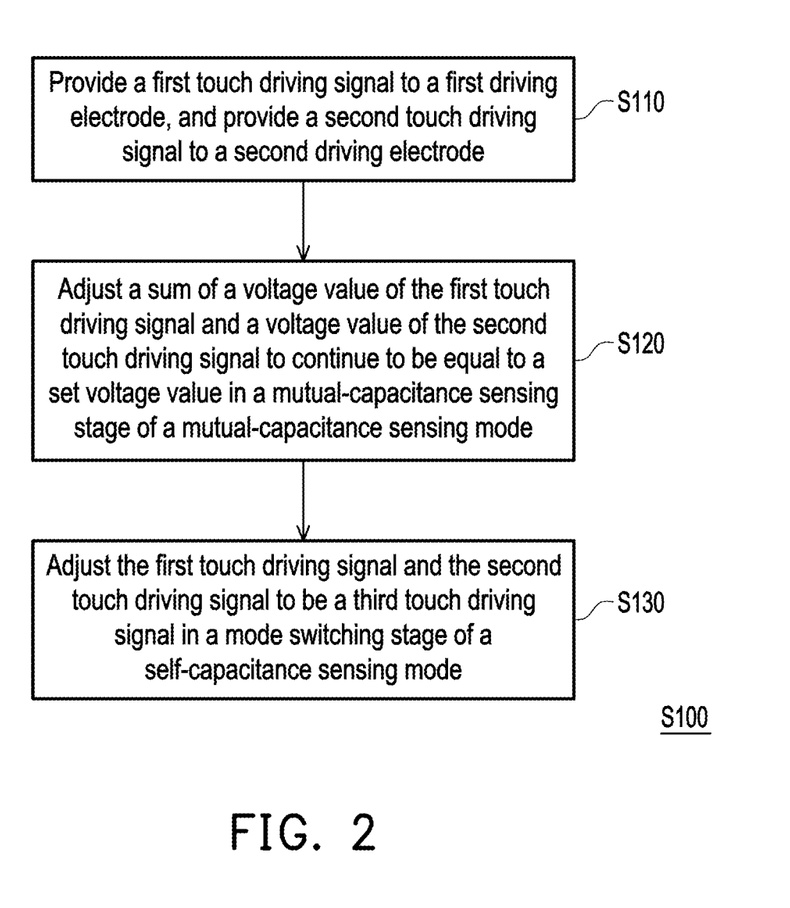
FIG. 2 is a flow chart of a touch driving method according to an embodiment of the disclosure.

Please refer to FIG. 1 and FIG. 2. FIG. 2 is a flow chart of a touch driving method according to an embodiment of the disclosure.

In the embodiment, a touch driving method S100 is applicable to the touch display device 10. The touch driving method S100 includes steps S110 to S130. In step S110, the touch display device 10 provides the touch driving signal STD1 (such as a first touch driving signal) to the driving electrode TX1 (such as a first driving electrode), and provides the touch driving signal STD2 (such as a second touch driving signal) to the driving electrode TX2 (such as a second driving electrode). In the embodiment, the touch driving signals STD1 and STD2 may be respectively provided by a touch drive circuit (not shown) of the touch display device 10.

In step S120, the touch display device 10 adjusts a sum of a voltage value of the touch driving signal STD1 and a voltage value of the touch driving signal STD2 to continue to be equal to a set voltage value AVDD in a mutual-capacitance sensing stage of a mutual-capacitance sensing mode. In step S130, the touch display device 10 adjusts the voltages of the touch driving signals STD1 and STD2 in a step-by-step manner to be a same third touch driving signal (such as a sine wave) in a mode switching stage of the self-capacitance sensing mode.

Based on the above, the sum of the voltage value of the touch driving signal STD1 and the voltage value of the touch driving signal STD2 continues to be equal to the set voltage value AVDD in the mutual-capacitance sensing stage. Therefore, the touch driving signals STD1 and STD2 do not interfere with the data signal SD of the display panel 11. In addition, the touch driving signal STD1 and the touch driving signal STD2 are adjusted in a step-by-step manner to be the same driving signal in the mode switching stage. In this way, the touch driving signals STD1 and STD2 may reduce the interference to the data signal SD of the display panel 11.

Figure 3:
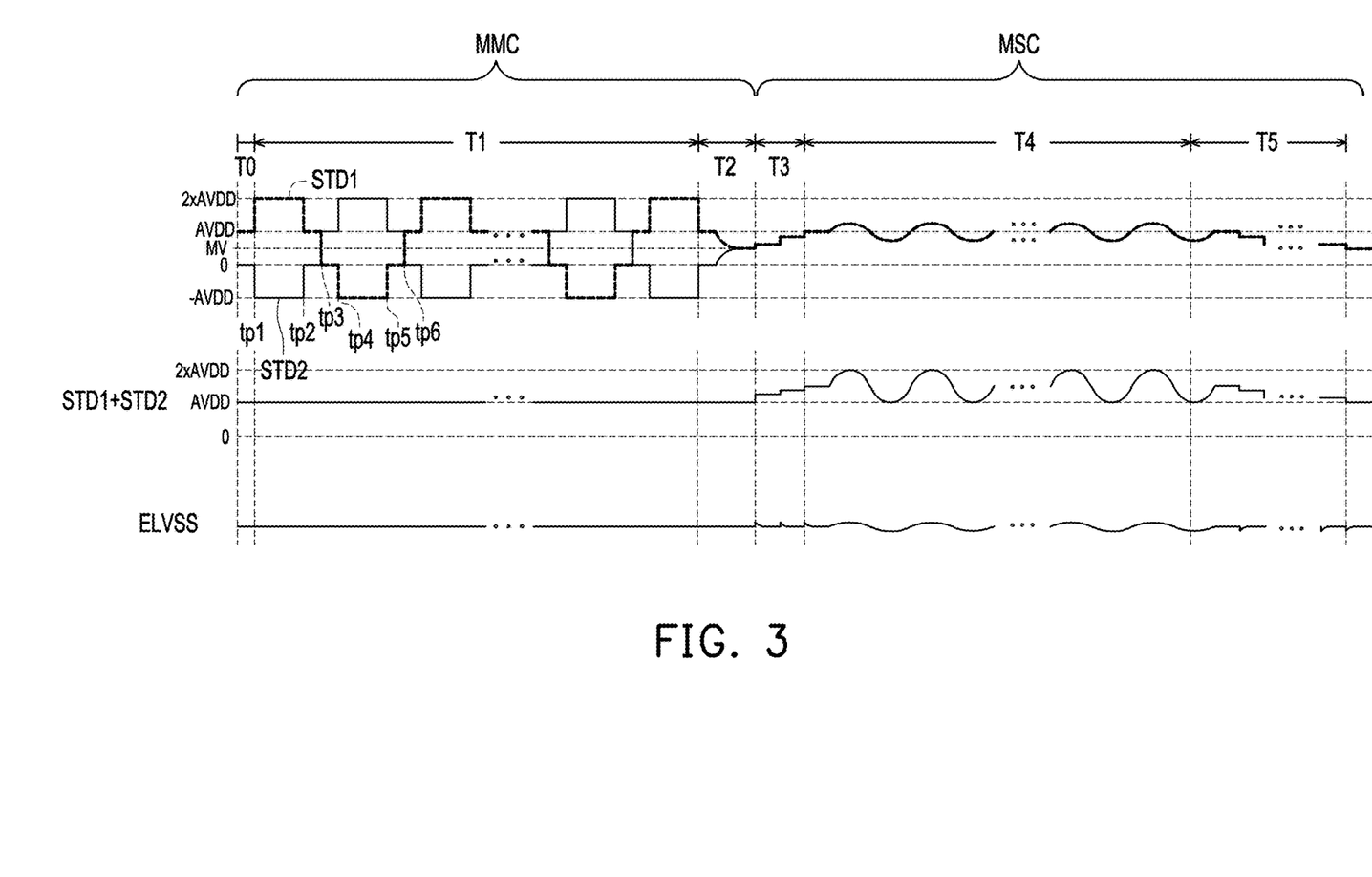
FIG. 3 is a waveform diagram of a touch driving signal according to an embodiment of the disclosure.

Please refer to FIG. 3. FIG. 3 is a waveform diagram of a touch driving signal according to an embodiment of the disclosure. In the embodiment, a mutual-capacitance sensing mode MMC includes a mutual-capacitance starting stage T0, a mutual-capacitance sensing stage T1, and a mutual-capacitance ending stage T2. A sum of a voltage value of the touch driving signal STD1 and a voltage value of the touch driving signal STD2 continues to be equal to the set voltage value AVDD in the mutual-capacitance starting stage T0. In the embodiment, an initial voltage value of the touch driving signal STD1 is different from an initial voltage value of the touch driving signal STD2 in the mutual-capacitance starting stage T0. Taking the embodiment as an example, the initial voltage value of the touch driving signal STD1 is equal to the set voltage value AVDD. The initial voltage value of the touch driving signal STD2 is equal to 0 volts.

The mutual-capacitance sensing stage T1 begins at a time point tp1. The touch driving signal STD1 has a step wave, and the touch driving signal STD2 has a step wave between the time point tp1 and a time point tp6. The step waves of the touch driving signals STD1 and STD2 are symmetrical to each other. The voltage value of the touch driving signal STD1 rises from the set voltage value AVDD to twice the set voltage value AVDD (such as "2×AVDD") in a first time interval between the time point tp1 and a time point tp2. The voltage value of the touch driving signal STD2 falls from 0 volts to a negative value of the voltage value AVDD (such as "−AVDD") in the first time interval from the time point tp1 to the time point tp2. In the embodiment, the voltage difference between the voltage value of the touch driving signal STD1 and the voltage value of the touch driving signal STD2 is equal to 3 times the set voltage value AVDD in the first time interval from the time point tp1 to the time point tp2. In other words, the voltage value of the touch driving signal STD1 and the voltage value of the touch driving signal STD2 have the maximum voltage difference in the first time interval from the time point tp1 to the time point tp2.

The voltage value of the touch driving signal STD1 falls from 2×AVDD to the set voltage value AVDD between the time point tp2 and a time point tp3. The voltage value of the touch driving signal STD2 rises from −AVDD to 0 volts. In the embodiment, the voltage difference between the voltage value of the touch driving signal STD1 and the voltage value of the touch driving signal STD2 is equal to the set voltage value AVDD in a time interval from the time point tp2 to the time point tp3. In the embodiment, the time interval from the time point tp1 to the time point tp2 is greater than the time interval from the time point tp2 to the time point tp3, but the disclosure is not limited thereto.

The voltage value of the touch driving signal STD1 falls from the set voltage value AVDD to the voltage value 0 volts between the time point tp3 and a time point tp4. The voltage value of the touch driving signal STD2 rises from 0 volts to the set voltage value AVDD. In the embodiment, the voltage difference between the voltage value of the touch driving signal STD1 and the voltage value of the touch driving signal STD2 is equal to the set voltage value AVDD in a time interval from the time point tp3 to the time point tp4. In the embodiment, the time interval from the time point tp1 to the time point tp2 is greater than the time interval from the time point tp3 to the time point tp4, but the disclosure is not limited thereto. The touch driving signals STD1 and STD2 respectively have voltage values with changes in a stepwise manner in a second time interval from the time point tp2 to the time point tp4.

The voltage value of the touch driving signal STD1 falls from 0 volts to the voltage value −AVDD between the time point tp4 and a time point tp5. The voltage value of the touch driving signal STD2 rises from the set voltage value AVDD to the voltage value 2×AVDD. In the embodiment, the voltage difference between the voltage value of the touch driving signal STD1 and the voltage value of the touch driving signal STD2 is equal to 3 times the set voltage value AVDD in a first time interval from the time point tp4 to the time point tp5. In other words, the voltage value of the touch driving signal STD1 and the voltage value of the touch driving signal STD2 have the maximum voltage difference in the first time interval from the time point tp4 to the time point tp5. The time interval from the time point tp1 to the time point tp2 is equal to the time interval from the time point tp4 to the time point tp5, but the disclosure is not limited thereto.

The voltage value of the touch driving signal STD1 rises from −AVDD to 0 volts in a second time interval from the time point tp5 to a time point tp6. The voltage value of the touch driving signal STD2 falls from 2×AVDD to the set voltage value AVDD. In the embodiment, the time interval from the time point tp1 to the time point tp2 is greater than the time interval from the time point tp5 to the time point tp6, but the disclosure is not limited thereto. The touch driving signals STD1 and STD2 respectively have voltage values with changes in a stepwise manner in the second time interval from the time point tp5 to the time point tp6.

The sum of the voltage values of the touch driving signals STD1 and STD2 is equal to the set voltage value AVDD between the time point tp1 to the time point tp6. The touch driving signal STD1 returns to the initial voltage value AVDD, the touch driving signal STD2 returns to the initial voltage value 0 volts, and so on after the time point tp6.

The sum of the voltage value of the touch driving signal STD1 and the voltage value of the touch driving signal STD2 continues to be equal to the voltage value AVDD in the mutual-capacitance ending stage T2. Taking the embodiment as an example, the voltage value of the touch driving signal STD1 is equal to the voltage value AVDD, and the voltage value of the touch driving signal STD2 is equal to 0 volts.

It should be noted that the sum of the voltage value of the touch driving signal STD1 and the voltage value of the touch driving signal STD2 continues to be equal to the set voltage value AVDD in the mutual-capacitance sensing mode MMC. In addition, the waveform of the touch driving signal STD1 and the waveform of the touch driving signal STD2 are symmetrical to each other. Therefore, the sum of the voltages of the touch driving signal STD1 and the touch driving signal STD2 is a constant value in the mutual-capacitance sensing mode MMC. The noise is not generated by the reference voltage ELVSS received by the reference electrode RE due to the interference by the touch driving signals STD1 and STD2.

In the embodiment, the voltage value of the touch driving signal STD1 and the voltage value of the touch driving signal STD2 gradually reach an intermediate voltage value MV in the mutual-capacitance ending stage T2. The noise generated by the reference voltage ELVSS received by the reference electrode RE due to the interference by the touch driving signals STD1 and STD2 may be reduced.

The self-capacitance sensing mode MSC includes a mode switching stage T3, a self-capacitance sensing stage T4 and a mode switching stage T5. The voltage value of the touch driving signal STD1 and the voltage value of the touch driving signal STD2 respectively rise in the same step-by-step manner from the intermediate voltage value MV to the voltage value AVDD in the mode switching stage T3. Therefore, the signal noise of the display panel 11 can be suppressed in the mode switching stage T3.

The initial voltage value of the touch driving signal is equal to AVDD, and the touch driving signals STD1 and STD2 may be driven by sine waves in the self-capacitance sensing stage T4.

The voltage value of the touch driving signal STD1 and the voltage value of the touch driving signal STD2 respectively fall in the same step-by-step manner from the voltage value AVDD to the intermediate voltage value MV in the mode switching stage T5, and are subsequently switched from the self-capacitance sensing mode MSC to the mutual-capacitance sensing mode MMC. Therefore, the signal noise of the display panel 11 can also be suppressed in the mode switching stage T5.

It should be noted that the noise generated by the reference voltage ELVSS received by the reference electrode RE due to the interference by the touch driving signals STD1 and STD2 may be reduced in the mode switching stage T5.

Figure 4:
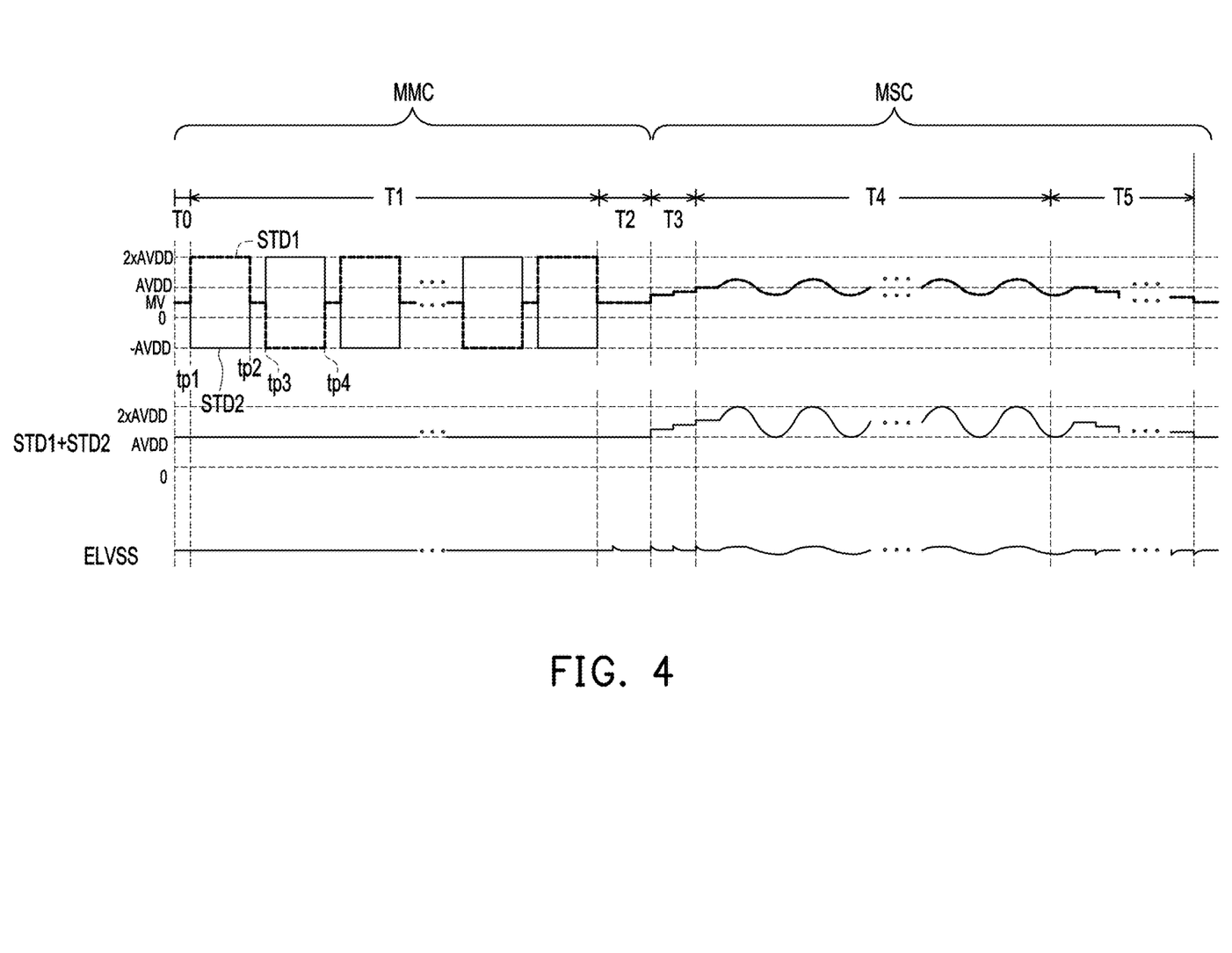
FIG. 4 is a waveform diagram of a touch driving signal according to an embodiment of the disclosure.

Please refer to FIG. 4. FIG. 4 is a waveform diagram of a touch driving signal according to an embodiment of the disclosure. In the embodiment, the mutual-capacitance sensing mode MMC includes the mutual-capacitance starting stage T0, the mutual-capacitance sensing stage T1, and the mutual-capacitance ending stage T2. The sum of the initial voltage value of the touch driving signal STD1 and the voltage value of the touch driving signal STD2 continues to be equal to the set voltage value AVDD in the mutual-capacitance starting stage T0. In the embodiment, the initial voltage value of the touch driving signal STD1 is the same as the initial voltage value of the touch driving signal STD2 in the mutual-capacitance starting stage T0. Taking the embodiment as an example, the voltage value of the touch driving signal STD1 and the voltage value of the touch driving signal STD2 are respectively equal to the intermediate voltage value MV (such as "0.5×AVDD") of the set voltage value AVDD.

The mutual-capacitance sensing stage T1 begins at the time point tp1. The touch driving signal STD1 has a step wave, and the touch driving signal STD2 has a step wave between the time point tp1 to the time point tp4. The step waves of the touch driving signals STD1 and STD2 are symmetrical to each other. The voltage value of the touch driving signal STD1 rises from the intermediate voltage value MV to twice the set voltage value AVDD (such as "2×AVDD") in a first time interval from the time point tp1 to the time point tp2. The voltage value of the touch driving signal STD2 falls from the intermediate voltage value MV to the negative value of the set voltage value AVDD (such as "−AVDD") between the time point tp1 and the time point tp2. In other words, the voltage value of the touch driving signal STD1 and the voltage value of the touch driving signal STD2 have the maximum voltage difference in the first time interval from the time point tp1 to the time point tp2.

The voltage value of the touch driving signal STD1 falls from 2×AVDD to the intermediate voltage value MV of the set voltage value AVDD in a second time interval from the time point tp2 to the time point tp3. The voltage value of the touch driving signal STD2 rises from −AVDD to the intermediate voltage value MV. The touch driving signals STD1 and STD2 respectively have voltage values with changes in a stepwise manner in the second time interval from the time point tp2 to the time point tp3. In the embodiment, the time interval from the time point tp1 to the time point tp2 is greater than the time interval from the time point tp2 to the time point tp3, but the disclosure is not limited thereto.

The touch driving signal STD1 has a pulse wave in a first time interval from the time point tp3 to the time point tp4. The voltage value of the touch driving signal STD1 falls from the intermediate voltage value MV to the set voltage value-AVDD. The voltage value of the touch driving signal STD2 rises from the intermediate voltage value MV to 2×AVDD. In other words, the voltage value of the touch driving signal STD1 and the voltage value of the touch driving signal STD2 have the maximum voltage difference in the first time interval from the time point tp3 to the time point tp4. Therefore, the sum of the voltage values of the touch driving signals STD1 and STD2 is equal to a fixed voltage value AVDD between the time point tp1 and the time point tp4. The voltage value of the touch driving signal STD1 returns to the intermediate voltage value MV, and so on after the time point tp4. In the embodiment, the time interval from the time point tp1 to the time point tp2 is equal to the time interval from the time point tp3 to the time point tp4, but the disclosure is not limited thereto.

The sum of the voltage value of the touch driving signal STD1 and the voltage value of the touch driving signal STD2 still continues to be equal to the set voltage value AVDD in the mutual-capacitance ending stage T2. Taking the embodiment as an example, the voltage value of the touch driving signal STD1 and the voltage value of the touch driving signal STD2 are respectively equal to the intermediate voltage value MV of the set voltage value AVDD.

It should be noted that the sum of the voltage value of the touch driving signal STD1 and the voltage value of the touch driving signal STD2 continues to be equal to the set voltage value AVDD in the mutual-capacitance sensing mode MMC. In addition, the waveform of the touch driving signal STD1 and the waveform of the touch driving signal STD2 are symmetrical to each other based on the intermediate voltage value. Therefore, the sum of the voltages of the touch driving signal STD1 and the touch driving signal STD2 is a constant value in the mutual-capacitance sensing mode MMC. The noise is not generated by the reference voltage ELVSS received by the reference electrode RE due to the interference by the touch driving signals STD1 and STD2.

In the embodiment, the self-capacitance sensing mode MSC includes the mode switching stage T3, the self-capacitance sensing stage T4 and the mode switching stage T5. The voltage value of the touch driving signal STD1 and the voltage value of the touch driving signal STD2 respectively rise in the same step-by-step manner from the intermediate voltage value MV to the voltage value AVDD in the mode switching stage T3. Therefore, the signal noise of the display panel 11 can be suppressed in the mode switching stage T3.

The implementations of the mode switching stage T3, the self-capacitance sensing stage T4 and the mode switching stage T5 in the embodiment are similar to the implementations of the mode switching stage T3, the self-capacitance sensing stage T4 and the mode switching stage T5 in the embodiments of FIG. 1 and FIG. 3, so the embodiments will not be repeated here.

Figure 5:
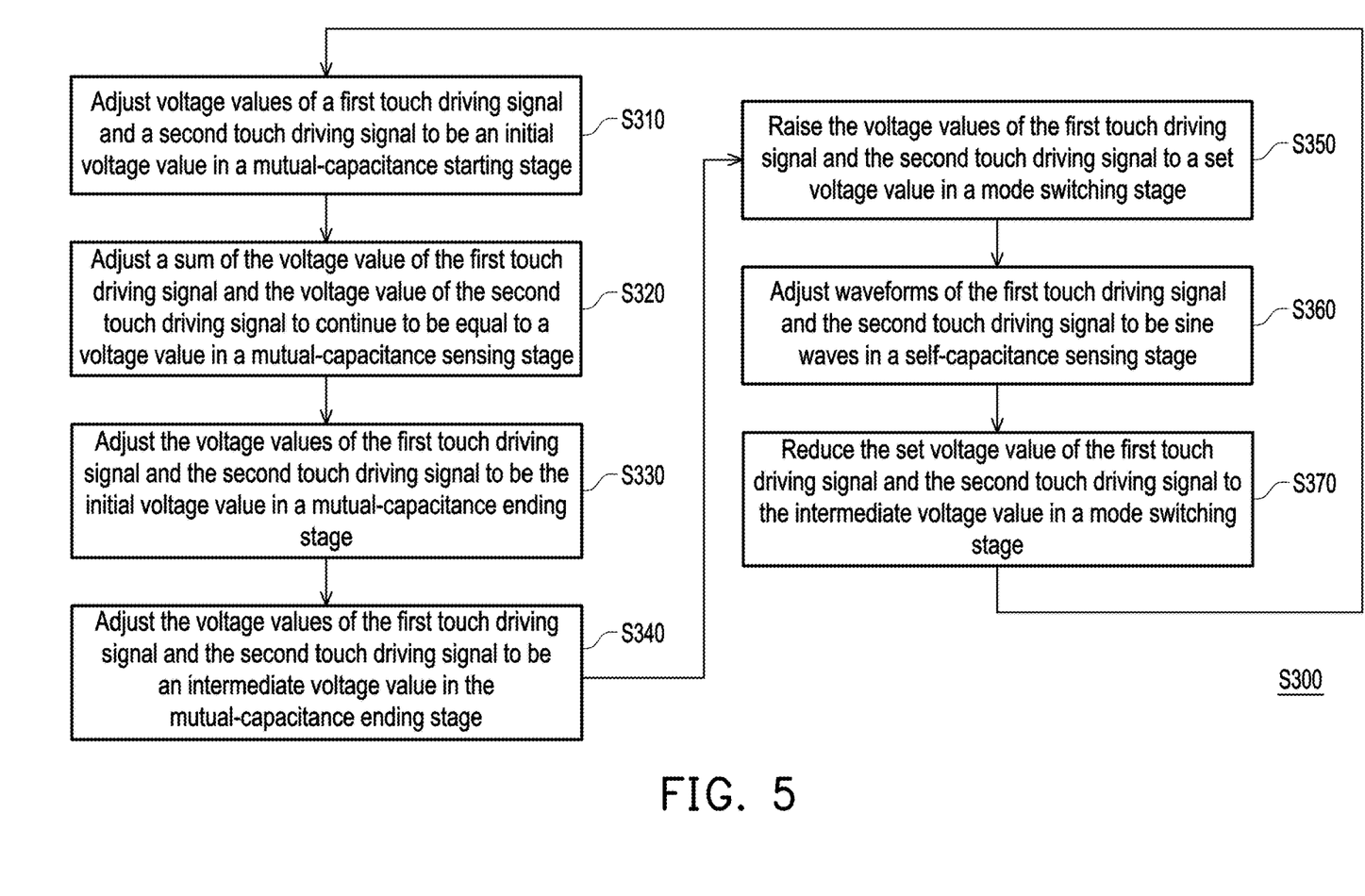
FIG. 5 is a flow chart of a touch driving method according to an embodiment of the disclosure.

Please refer to FIG. 3, FIG. 4 and FIG. 5. FIG. 5 is a flow chart of a touch driving method according to an embodiment of the disclosure. A touch driving method S300 is applicable to the touch display device 10. In the embodiment, the touch driving method S300 includes steps S310 to S370. In step S310, the touch display device 10 adjusts the voltage values of the touch driving signals STD1 and STD2 to be the initial voltage value in the mutual-capacitance starting stage T0.

In step S320, the touch display device 10 adjusts the touch driving signals STD1 and STD2 in the mutual-capacitance sensing stage T1. Therefore, the sum of the voltage value of the touch driving signal STD1 and the voltage value of the touch driving signal STD2 continues to be equal to the set voltage value AVDD.

In step S330, the touch display device 10 adjusts the voltage values of the touch driving signals STD1 and STD2 to be the initial voltage value in the mutual-capacitance ending stage T2.

In step S340, the touch display device 10 adjusts the voltage values of the touch driving signals STD1 and STD2 to be the intermediate voltage value MV in the mutual-capacitance ending stage T2.

In step S350, the touch display device 10 adjusts the voltage values of the touch driving signals STD1 and STD2 in a step-by-step manner in the mode switching stage T3. Therefore, the voltage values of the touch driving signals STD1 and STD2 rise from the intermediate voltage value MV to the set voltage value AVDD in the mode switching stage T3.

In step S360, the touch display device 10 adjusts the waveforms of the touch driving signals STD1 and STD2 to sine waves in the self-capacitance sensing stage T4.

In step S370, the touch display device 10 adjusts the voltage values of the touch driving signals STD1 and STD2 in a step-by-step manner in the mode switching stage T5. Therefore, the voltage values of the touch driving signals STD1 and STD2 are reduced in a step-by-step manner from the set voltage value AVDD to the intermediate voltage value MV in the mode switching stage T5.

To sum up, the sum of the voltage value of the first touch driving signal and the voltage value of the second touch driving signal continues to be equal to the set voltage value in the mutual-capacitance sensing stage. The voltages of the first touch driving signal and the second touch driving signal do not interfere with the data signal of the display panel. In addition, the first touch driving signal and the second touch driving signal are respectively adjusted to be the same third touch driving signal in the self-capacitance sensing stage. The third touch driving signal may be a sine wave. In addition, in some embodiments, the voltage value of the touch driving signal is adjusted in a step-by-step manner in the mode switching stage of the mutual-capacitance sensing mode. Therefore, the signal noise of the display panel can be suppressed in the mode switching stage of the mutual-capacitance sensing mode.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A touch driving method for a touch display device, wherein the touch display device comprises a display panel and a touch panel, the touch panel is disposed on the display panel, and the touch panel comprises a first driving electrode and a second driving electrode, wherein the touch driving method comprises:
   providing a first touch driving signal to the first driving electrode, and providing a second touch driving signal to the second driving electrode;
   adjusting a sum of a voltage value of the first touch driving signal and a voltage value of the second touch driving signal to continue to be equal to a positive set voltage value in a mutual-capacitance sensing stage of a mutual-capacitance sensing mode, wherein the first touch driving signal received by the first driving electrode and the second touch driving signal received by the second driving electrode are different driving signals with symmetrical waveforms in the mutual-capacitance sensing mode; and
   in response to switching from the mutual-capacitance sensing mode to a self-capacitance sensing mode, adjusting the first touch driving signal received by the first driving electrode and the second touch driving signal received by the second driving electrode to be a same third touch driving signal in a self-capacitance sensing stage of the self-capacitance sensing mode.

2. The touch driving method according to claim 1, wherein the first touch driving signal and the second touch driving signal are step waves.

3. The touch driving method according to claim 2, wherein the voltage value of the first touch driving signal and the voltage value of the second touch driving signal have a maximum voltage difference in a first time interval of the mutual-capacitance sensing stage and have voltage values with changes in a stepwise manner in a second time interval of the mutual-capacitance sensing stage.

4. The touch driving method according to claim 3, wherein the maximum voltage difference between the first touch driving signal and the second touch driving signal is equal to 3 times the positive set voltage value in the first time interval of the mutual-capacitance sensing stage.

5. The touch driving method according to claim 3, wherein a time length of the first time interval is greater than a time length of the second time interval.

6. The touch driving method according to claim 3, wherein a voltage difference between the first touch driving signal and the second touch driving signal is equal to the positive set voltage value in the second time interval of the mutual-capacitance sensing stage.

7. The touch driving method according to claim 3, wherein the voltage value of the first touch driving signal is equal to the voltage value of the second touch driving signal in the second time interval of the mutual-capacitance sensing stage.

8. The touch driving method according to claim 1, wherein the third touch driving signal is a sine wave.

9. The touch driving method according to claim 1, further comprising:
adjusting the sum of the voltage value of the first touch driving signal and the voltage value of the second touch driving signal to continue to be equal to the positive set voltage value in a mutual-capacitance starting stage and a mutual-capacitance ending stage of the mutual-capacitance sensing mode, wherein
the mutual-capacitance starting stage is earlier than the mutual-capacitance sensing stage, and
the mutual-capacitance ending stage is later than the mutual-capacitance sensing stage.

10. The touch driving method according to claim 9, wherein an initial voltage value of the first touch driving signal is not equal to an initial voltage value of the second touch driving signal in the mutual-capacitance starting stage.

11. The touch driving method according to claim 9, further comprising:
adjusting a first voltage value of the first touch driving signal and a second voltage value of the second touch driving signal to an intermediate voltage value of the first voltage value and the second voltage value in the mutual-capacitance ending stage.

12. The touch driving method according to claim 1, further comprising:
adjusting the voltage value of the first touch driving signal and the voltage value of the second touch driving signal respectively in a step-by-step manner to an initial voltage of the third touch driving signal in a mode switching stage between the mutual-capacitance sensing mode and the self-capacitance sensing mode.

13. The touch driving method according to claim 1, further comprising:
adjusting a voltage value of a touch driving signal in a step-by-step manner to an intermediate voltage value of the voltage value of the first touch driving signal and the voltage value of the second touch driving signal in a mode switching stage between the self-capacitance sensing mode and the mutual-capacitance sensing mode.

* * * * *